Figure 1:
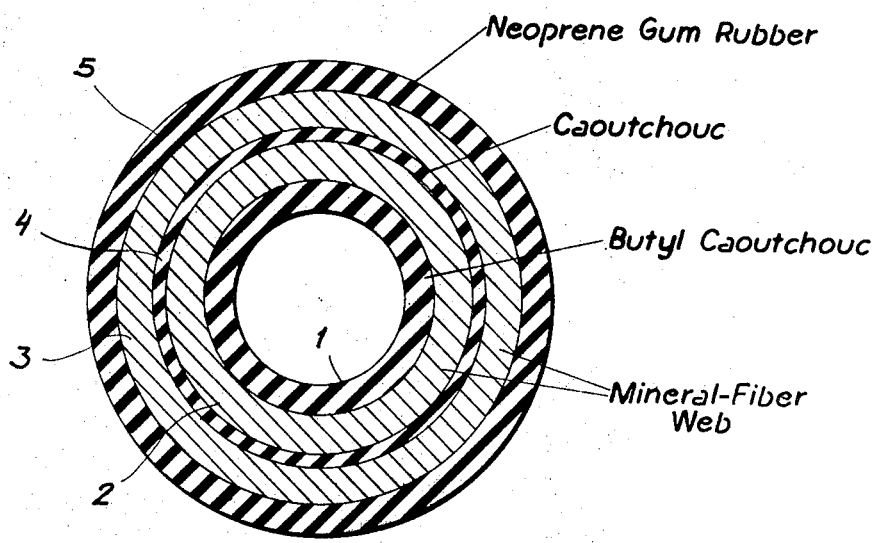

United States Patent

[11] 3,550,640

[72] Inventors Karl Wagner
 Neu Isenburg;
 Ralph Andre Hubscher, Frankfurt am Main, Germany
[21] Appl. No. 675,810
[22] Filed Oct. 17, 1967
[45] Patented Dec. 29, 1970
[73] Assignee Alfred Teves GmbH
 Frankfurt am Main, Germany
 a corporation of Germany
[32] Priority Oct. 18, 1966
[33] Germany
[31] No. T32,301

[54] BRAKE-LINE HOSE
 2 Claims, 2 Drawing Figs.
[52] U.S. Cl..................................................... 138/137,
 138/141
[51] Int. Cl. ..................................................... F16l 11/00

[50] Field of Search................................................ 138/140,
 141, 145, 146, 153, (Glass Fiber Digest), 126;
 138/137

[56] References Cited
UNITED STATES PATENTS
2,943,009  6/1960  Mirsky et al. ............... 138/Glass Fiber
3,026,223  3/1962  Vanderbilt et al. ...........  138/141

Primary Examiner—Houston S. Bell, Jr.
Attorney—Karl F. Ross

ABSTRACT: A brake-line hose for automotive vehicle brake-fluidtransmission systems comprising an inner layer of an elastomeric material, i.e. inert gum rubber adapted to resist organic solvents, a reinforcing layer surrounding the inner layer of a nonbibulous filament web embedded in the rubber body, and an outer layer of rubber, the nonbibulous layer consisting of fibers having substantially no wicking capability, capillarity of water penetrability and selected from inorganic mineral fibers, especially glass fibers, and polyvinylidene chloride and polyethylene fibers.

Karl Wagner
Ralph A. Hubscher
INVENTORS.

BY
Karl F. Ross
Attorney

BRAKE-LINE HOSE

Our present invention relates to brake-fluid transmission lines and, more particularly, to brake-fluid hose especially in automotive applications, designed to prevent accumulations of moisture in the brake fluid.

The disadvantages arising from the penetration of water into brake-fluid transmission lines are well known to those dealing with automotive vehicle brakes in which the transmission lines connect a pedal-operated master cylinder with one or more sets of wheel brakes. The accumulation of water in the brake fluid not only changes the viscosity of the fluid and creates a temperature sensitivity thereof, but also is considered a cause of the formation of gas pockets within the network, such pockets being compressible to reduce brake efficiency and frequently blocking brake operation even when the pedal is floored.

We have found that the penetration of water in liquid or vapor form into the brake-fluid transmission lines of conventional systems appears to be due to the capillarity or wicking power of reinforcing layers of fabric embedded in or laminated onto the walls of such tubes. Thus, conventional brake-fluid transmission pipes have an inner layer or tubular core of gum rubber i.e. caoutchouc surrounded by, for example, two intermediate layers of textile webs, and an outer layer of gum rubber or caoutchouc. Investigations have shown that a large quantity of moisture is capable of penetrating walls of such tubes, the tests involving placement of tubes filled with anhydrous brake fluid in atmospheres of high humidity. It appears that the ambient moisture is drawn through the gum-rubber layer and into the tube at least in part by the rayon or cotton cellulosic fibers constituting the reinforcing fabric.

It is, therefore, the principal object of the present invention to provide an improved brake-fluid transmission pipe for an automotive vehicle brake network wherein the aforementioned disadvantages are avoided and which restricts moisture penetration to the brake fluid.

We have now found that it is possible to eliminate moisture penetration in pipes having one or more layers of gum rubber and a reinforcing web between the gum-rubber layers which makes use of a nonbibulous fabric whose filaments themselves are water impenetrable and which has little or no wicking capabilities. The term "nonbibulous" is used herein to indicate that the fabric has no tendency to absorb and adsorb moisture in a humid atmosphere while wicking ability relates to the capillary abstraction of water from a bath thereof. Thus, a nonbibulous fabric of low or insignificant wicking ability will show no capillary rise of water along a strip of a fabric when partly immersed in a water bath, will not retain any moisture beyond that which is adherent by virtue of partial wetting of the fibers, and will have substantially no tendency to adsorb moisture from a humid atmosphere.

Furthermore, the "water impenetrability" of the fibers identifies a characteristic which can be considered in terms of the individual absorptivity and swelling of the fibers. For example, cotton or rayon cellulosic fibers, even if not used in a yarn, are a cellular construction and absorb moisture with swelling of the fiber. The fibers and filaments used in accordance with the present invention are those which cannot be penetrated by water and cannot absorb moisture into the interior of the fiber. Essentially, the reinforcing webs of the present invention can be composed in whole or in part of the fibers from the class of inorganic ceramiclike fibers including glass, asbestos (e.g. chrysotile or chrocidolite fibers) and aluminasilica fibers, while synthetic resin fibers of polyethylene and polyvinylidene chloride-type chlorides are also suitable although less effective. Best results are obtained with glass fibers and especially those of borosilicate glass.

Borosilicate glass fibers may be of the commercially available type of filament and staple length, diameters of 5 to 16 microns and circular cross sections. They generally have specific gravities of about 2.54. Chrysotile fibers have lengths of 1 cm. to 5 cm., diameters of 2 to 20 microns, while chrocidolite fibers have lengths of 0.5 cm. to 25 cm. and mean diameters of 2 to 20 microns.

As indicated, the most successful results are obtainable when the inlay is composed completely of woven glass fiber fabric.

According to a more specific feature of this invention, the inlay or intermediate layer can be composed of a single layer of mineral fiber fabric or two or more individual and laminated layers thereof. The layers can be separated by an intervening layer of gum rubber and, moreover, the gum rubber may penetrate the interstices of the glass fiber webs.

The advantages of this system include not only the reduced penetration of moisture through the brake-fluid pipes into the anhydrous liquid therein, but also a sharp increase in the bursting strength, tensile strength and wear resistance of the rubber tubing. It will also be noted that the fiber glass inlay reduces the stretchability or yieldability of the tubes under the application of brake pressure and, consequently, decreases the tendency toward increase in the volume of the transmission lines during brake operation. The volume requirements of the master cylinder and the stroke of the pedal are correspondingly reduced. In addition, the useful life of the pipes is an important factor in their improved character.

Figure 2:
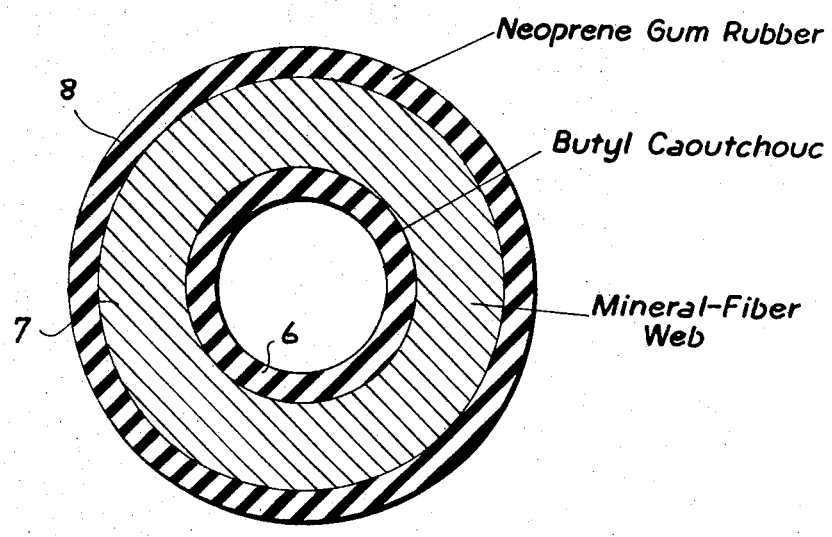

The above and other objects, features and advantages of the present invention will become more readily apparent from the following description, reference being made to the accompanying drawing in which:

FIG. 1 is a cross-sectional view in diagrammatic form through a brake-fluid transmission line embodying the present invention; and FIG. 2 is a similar cross-sectional view through another embodiment of this invention.

In FIG. 1, I show a brake-fluid hose which, according to the invention, comprises an inner tubular layer or core 1 of elastomeric material, preferably a gum rubber of the caoutchouc-type and, advantageously, a butyl caoutchouc. This layer 1 is surrounded by a glass fiber fabric web as a tubular intermediate layer 2 which is separated by an intervening layer 4 of caoutchouc from a second intermediate layer 3 of glass fiber web, the webs both consisting of borosilicate glass fibers which may be permeated by the gum rubber of the layers 1, 4 or 5 when the tubular body is vulcanized into an integral member. The outer layer of the hose consists of gum rubber of the usual type.

In the modification of FIG. 2, the intermediate layer 7 is composed of a single layer of glass fiber fabric while the inner layer 6 is composed of butyl caoutchouc and the outer layer is a gum rubber of the neoprene type. In both embodiments, the glass fiber is preferably a borosilicate glass fabric closely woven from the fibers marketed under the name Beta Glass Fiber by Owens-Corning Fiberglass Corporation.

According to a specific feature of this invention, the surfaces of the glass fiber web are treated to improve their adhesion to the rubber layers by chemical or physical etch or corona discharge. Suitable chemical etching techniques involve the treatment of the fiberglass fabric with dilute solution of hydrofluoric acid or the treatment with gaseous boron or hydrogen fluoride. Physical methods involve passing the fabric through a corona discharge. When the rubber layers are vulcanized to coherency by conventional techniques, a strong bond to the glass fabric layer is ensured. The rubber layers can be applied by dipping or spraying the elastomeric material (from nozzles) onto the fiberglass web, followed by vulcanization although conventional laminating procedures may be employed.

The invention described and illustrated is believed to admit of many modifications within the ability of persons skilled in the art, all such modifications being considered within the spirit and scope of the appended claims.

We claim:

1. A brake-line hose for a brake-fluid transmission system of an automotive vehicle, comprising:
   a. at least one tubular core of butyl rubber;
   b. at least one intermediate layer of a nonbibulous web of a low wicking fiberglass surrounding said core; and c. at least one outer layer of neoprene rubber covering said intermediate layer, said layers and said core being bonded together by vulcanization.

2. The brake-line hose defined in claim 1 wherein a plurality of said intermediate layers of said web are provided with intervening gum-rubber layers.